United States Patent
Kolb et al.

(10) Patent No.: US 7,463,259 B1
(45) Date of Patent: Dec. 9, 2008

(54) SUBSHADER MECHANISM FOR PROGRAMMING LANGUAGE

(75) Inventors: Craig E. Kolb, Mountain View, CA (US); William R. Mark, Austin, TX (US); Cass W. Everitt, Pflugerville, TX (US); Matthew M. Pharr, San Francisco, CA (US); Rev Lebaredian, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 794 days.

(21) Appl. No.: 10/741,691

(22) Filed: Dec. 18, 2003

(51) Int. Cl.
*G06T 15/50* (2006.01)
(52) U.S. Cl. ...................................... 345/426
(58) Field of Classification Search ................ 345/426, 345/589

See application file for complete search history.

(56) References Cited

OTHER PUBLICATIONS

Cook, "Shade Trees", 1984, ACM, pp. 223-231.*

* cited by examiner

*Primary Examiner*—Ryan R Yang
(74) *Attorney, Agent, or Firm*—Townsend and Townsend and Crew LLP

(57) ABSTRACT

A graphics processing subsystem is programmed with shader programs that make calls to an abstract interface. One or more subshaders implementing the functions of the abstract interface can also be defined. The binding of interfaces to functions is resolved by a language runtime module that compiles the subshaders. As shader programs are compiled, the runtime module determines whether each method call is associated with an interface function. For each interface method call, the runtime module determines the appropriate implementation of the interface to be bound to the method call. Once the appropriate implementation is identified, the interface binding is created using string substitution or indirect addressing instructions. At the time of compilation, which may be during the execution of the rendering application, the desired combinations of subshaders are specified and compiled into a combined shader program, which can then be executed by the graphics processing subsystem.

15 Claims, 5 Drawing Sheets

SUBSHADER MECHANISM FOR PROGRAMMING LANGUAGE

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Many graphics processing subsystems are highly programmable, enabling implementation of, among other things, complicated lighting and shading algorithms. In order to exploit this programmability, applications can include one or more graphics processing subsystem programs, which are executed by the graphics processing subsystem in parallel with a main program executed by the CPU. Although not confined to merely implementing shading and lighting algorithms, these graphics processing subsystem programs are often referred to as shader programs or shaders. Shader programs can be used to define a set of operations to be performed on object geometry, object vertices, and/or fragments, which are groups of pixels or subpixels.

In their most basic form, shader programs can be written in an assembly-like language specifically tailored to the graphics processing subsystem. Although this type of language allows for highly optimized shader programs, it is often cumbersome to use, requires detailed knowledge of the design of the graphics processing subsystem, and makes developing portable shader programs difficult, if not impossible. There are also high level shading-specific languages designed around abstract models of lighting and shading operations, such as Pixar's RenderMan. However, these shading-specific languages are intended for non-real-time rendering application and are typically too far removed from the underlying architecture of typical graphics processing subsystems to be used for real-time rendering applications.

To address these deficiencies, high level graphics processing subsystem languages, such as Nvidia's Cg, have been developed. High level graphics processing subsystem languages are designed around the general architecture of typical graphics processing subsystems. However, unlike assembly-type languages, high level graphics processing subsystem languages provide a large degree of abstraction, greatly simplifying the development of shader programs. Additionally, shader programs written with high level graphics processing subsystem languages can be easily made portable. Further, because the high level graphics processing subsystem language is designed around the general architecture of typical graphics processing subsystems, they are well-suited for implementing real-time rendering.

One difficulty with high-level graphics processing subsystem languages, high-level shading-specific languages, and even assembly-like graphics processing subsystem languages is the inability to dynamically combine two or more shader program components, referred to as subshaders, into a single shader program. Graphics processing subsystems typically lack the complex branching and indirection capabilities of typical CPUs, making conventional methods of combining programs, such as dynamic linking, impossible to implement.

Previously, developers could construct a monolithic shader program encompassing all of the possible combinations of subshaders. The graphics processing subsystem would then be instructed to skip over the unused portions of the program during execution. However, this solution results in a very large shader program that is difficult to modify or expand and inefficient to execute. Additionally, with this approach, all combinations of subshaders are required to be known in advance. Alternatively, developers could enable their application to dynamically generate code for a desired combination of subshaders on the fly. However, this approach is difficult to implement and error-prone.

It is therefore desirable for a graphics processing subsystem to facilitate the composition of shader programs from two or more modular subshaders. It is also desirable for the graphics processing subsystem to enable the creation of new shader programs dynamically and without advance knowledge of the desired combination of subshaders or the specific limitations of the graphics processing subsystem. The ability to easily add additional subshaders is another desired feature of a graphics processing subsystem. It is further desirable that the resulting shader program executes efficiently and does not include large amounts of unexecuted code.

BRIEF SUMMARY OF THE INVENTION

A graphics processing subsystem is programmed with shader programs that make calls to an abstract interface. One or more subshaders implementing the functions of the abstract interface can also be defined. The binding of interfaces to functions is resolved by a language runtime module that compiles the subshaders. As shader programs are compiled, the runtime module determines whether each method call is associated with an interface function. For each interface method call, the runtime module determines the appropriate implementation of the interface to be bound to the method call. Once the appropriate implementation is identified, the interface binding is created using string substitution or indirect addressing instructions. At the time of compilation, which may be during the execution of the rendering application, the desired combinations of subshaders are specified and compiled into a combined shader program, which can then be executed by the graphics processing subsystem.

In an embodiment, a method of programming a graphics processing subsystem comprises selecting a first shader program for execution by the graphics processing subsystem, identifying a reference to a method associated with an interface in the first shader program, selecting one of a plurality of subshaders, wherein each subshader implements the method associated with the interface, and binding the first shader program with selected subshader to create a combined shader program.

In another embodiment, the first shader program is selected in response to receiving a command from a rendering application via a language runtime API. In an additional embodiment, one of the plurality of subshaders is selected in response to receiving a command from a rendering application via a language runtime API.

In one embodiment, the combined shader program is compiled, and the compiled shader program is then communicated with the graphics processing subsystem. In a further embodiment, an array size parameter is received during compilation, and an array having a size determined by the array size parameter is created.

In yet another embodiment, binding uses string substitution to merge the first shader program with the selected subshader. In an alternate embodiment, binding uses indirect addressing to merge the first shader program with the selected subshader.

In a further embodiment, the plurality of subshaders can specify a plurality of implementations of lights, a plurality of implementations of materials, or a plurality of implementations of textures. In a further embodiment, the combined shader program is a material tree.

BRIEF DESCRIPTION OF THE DRAWINGS

The invention will be described with reference to the drawings, in which.

DETAILED DESCRIPTION OF THE INVENTION

Figure 1:
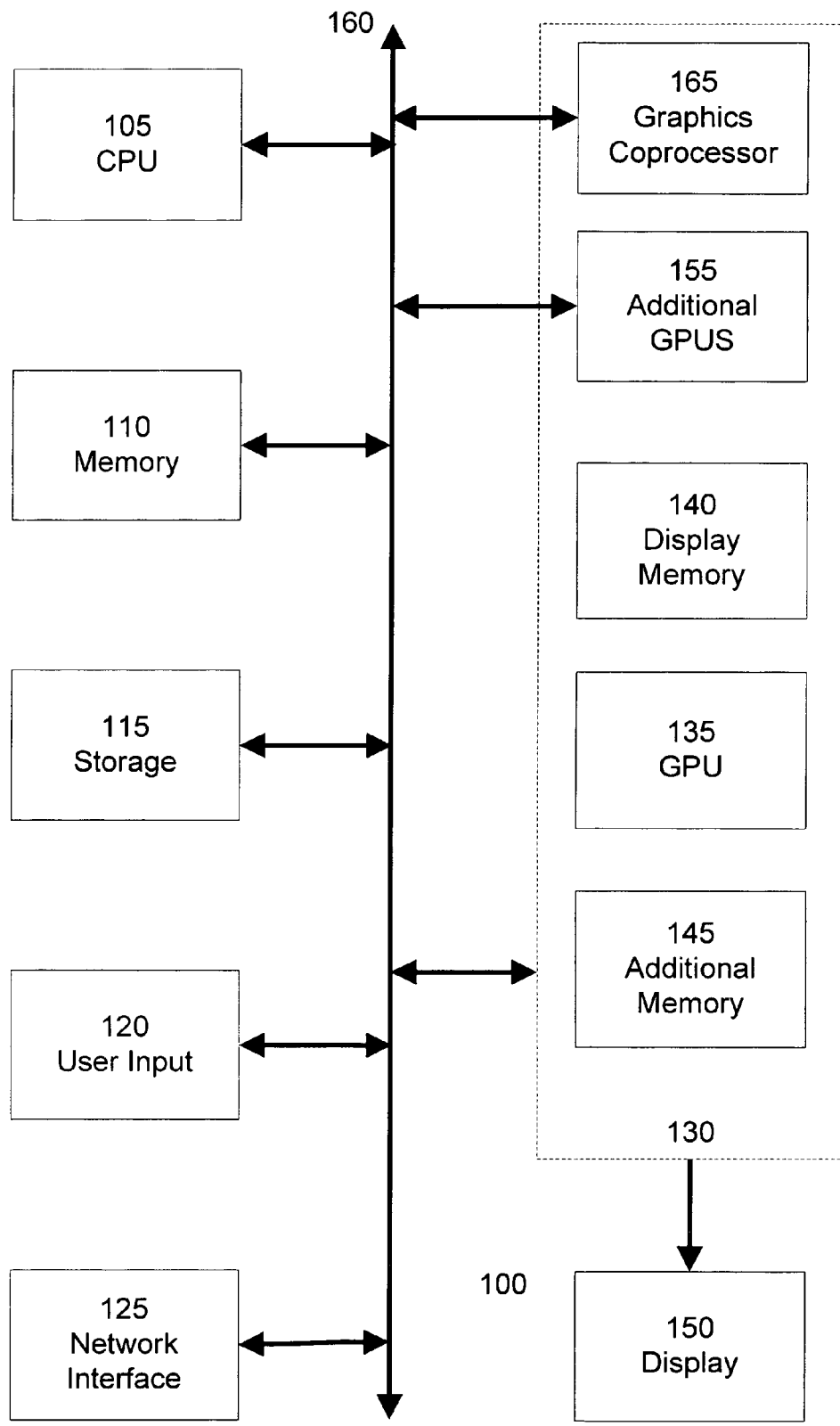
FIG. 1 illustrates a computer system suitable for implementing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X, and Hypertransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge chip used to control the data bus 160.

Figure 2:
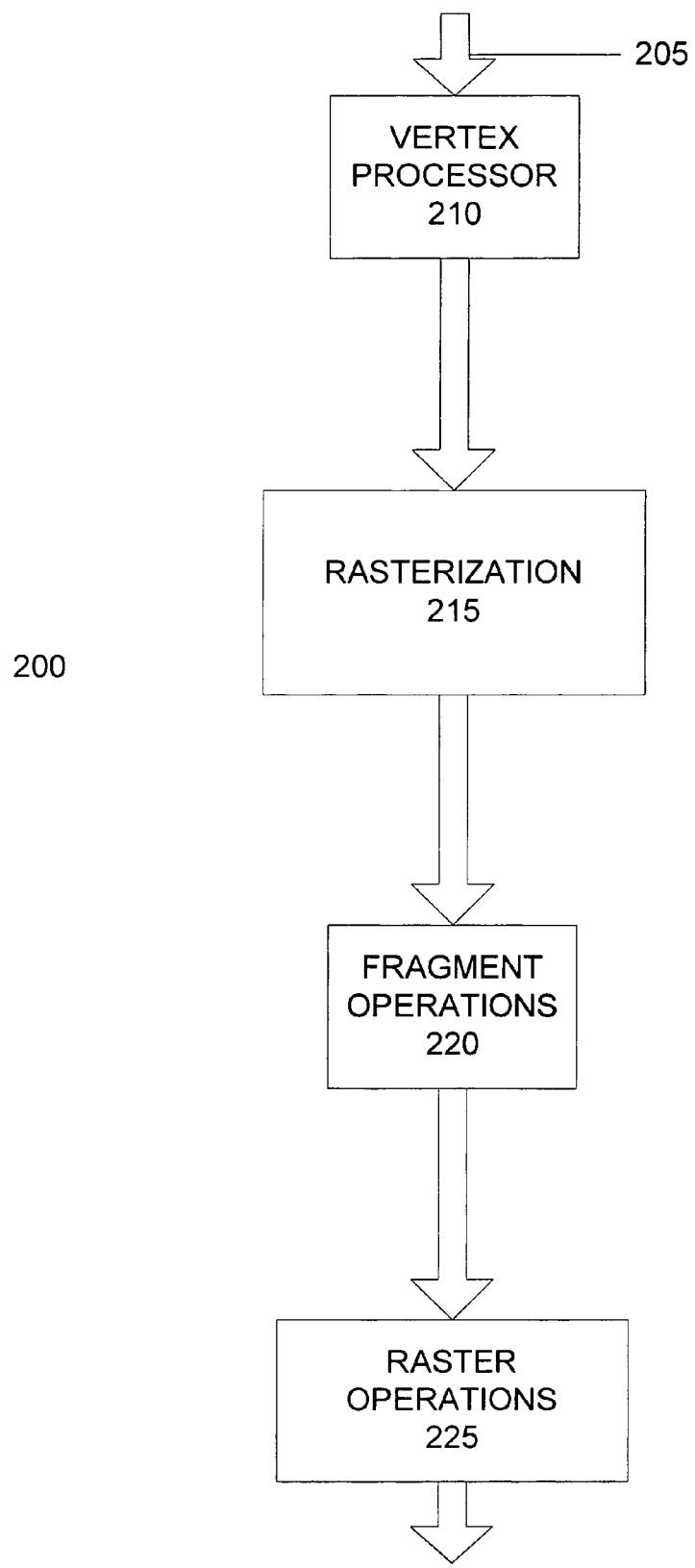
FIG. 2 illustrates an example graphics processing pipeline of a graphics processing subsystem suitable for implementing an embodiment of the invention.

FIG. 2 illustrates an example graphics processing pipeline 200 of a graphics processing subsystem suitable for implementing an embodiment of the invention. Graphics processing pipeline 200 uses a stream-processing model, in which input elements are successively read and operated on by the graphics processing pipeline 200. Each stage of the graphics processing pipeline 200 can operate on the output of the previous pipeline stage. As discussed in detail below, some or all of the pipeline stages may be programmable. Programmable pipeline stages read an input element, execute a program using the input element, and output the result to the next pipeline stage. Each pipeline stage can have its own separate program operating independently or in conjunction with another pipeline stage program.

Input stream 205 includes rendering commands and data used to define the desired rendered image or images, including geometry, lighting, shading, texturing, motion, and/or camera parameters for a scene. The vertex processor 210 reads each rendering command and any associated data from the input stream 205. The rendering data may include one or more untransformed vertices. A vertex program, also referred to as a vertex shader, is executed by vertex processor 210 on each untransformed vertex to create a transformed vertex. The vertex processor 210 is programmable and rendering applications can specify the vertex program to be used for any given set of vertices. In a simple embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations.

The transformed vertices are passed from the vertex processor 210 to the rasterization stage 215. The rasterization stage 215 assembles one or more vertices into a geometric primitive, such as a triangle or quadrilateral. The rasterization stage 215 then converts each geometric primitive into one or more pixel fragments. A pixel fragment defines a set of one or more pixels to be potentially displayed in the rendered image. Each pixel fragment includes information defining the appearance of its pixels, for example screen position, texture coordinates, color values, and normal vectors.

The pixel fragments are then passed from the rasterization stage 215 to the fragment operation stage 220. The fragment operation stage 220 uses the information associated with each pixel fragment to determine the output color value of each pixel to be potentially displayed. Like the vertex processor 210, the fragment operation stage is programmable. A pixel fragment program, also referred to as a pixel shader, is executed on each pixel fragment to determine an output color value for a pixel. Although the pixel fragment operates independently of the vertex program, the pixel fragment program may be dependent upon information created by or passed through previous pipeline stages, including information created by a vertex program. Rendering applications can specify the pixel fragment program to be used for any given set of pixel fragments. Pixel fragment programs can be used to implement a variety of visual effects, including lighting and shading effects, reflections, texture mapping and procedural texture generation.

The set of pixels are then output to the raster operations and storage stage 225. The raster operations stage 225 integrates the set of pixels with the rendered image. Pixels can be blended or masked pixels with pixels previously written to the rendered image. Depth buffers, alpha buffers, and stencil buffers can also be used to determine the contribution of each incoming pixel, if any, to the rendered image. The combination of each incoming pixel and any previously stored pixel values is then output to the frame buffer as part of the rendered image.

To take advantage of the immense flexibility available from the programmable vertex and fragment processing pipeline stages, high-level graphics processing subsystem languages have been developed. As an example, the Cg programming language has a syntax similar to the C programming language. The Cg language supports standard C scalar data types such as "float." Additionally, Cg supports vector data types, such as "float4", which represents a vector of four-dimensional floating-point vector, and matrix data types, such as "float4×4", which is a four by four floating-point matrix. Cg provides similar operators and library functions as the C programming language, with additional functionality to support vectors and matrices in addition to scalar variables. Additionally, Cg includes memory management functionality adapted to the memory access model of graphics processing units.

Shader programs in a high-level graphics processing language are processed by a compiler to produce a corresponding set of assembly code or low-level binary code. In an embodiment, as discussed below, the compiler processes is integrated with the graphics API and device driver in order to process source code into binary code during the execution of the rendering application.

As discussed above, it is desirable for a high-level graphics processing subsystem language to be able to dynamically compose shader programs from two or more shader program components. To combine shader program components into a complete shader program, programmers can define an interface that describes the desired behavior between two or more program components. Each shader program component, or subshader, implements the behavior of the interface. Subshaders include one or more subshader methods, each defining a subset of operations to be performed on geometry, vertices, or fragments.

In an embodiment, a high-level graphics processing subsystem language defines an interface with one or more method or function prototypes, each specifying a method of the interface and the number and data types of their arguments and return values. A subshader implementing the interface with have a set of subshader methods corresponding with the set of method prototypes of the interface.

Table 1 illustrates the source code of an example interface definition for a high-level graphics processing subsystem language. The example in table 1 defines an interface for a light. This example light interface includes two methods: a direction method that returns the direction of the light with respect to a given point in space, and an illuminate method that returns the illumination value of a light.

TABLE 1

Example Interface Definition

```
// Declare interface to lights
interface Light {
float3 direction(float3 p);
float4 illuminate(float3 p, out float3 lv);
};
```

Once a programmer defines the interface, any number of subshaders implementing the interface can be created. Each subshader may implement the methods of the interface A differently, allowing for different types of behavior. In addition to implementing the interface methods, each subshader can optionally have its own attributes values and non-interface methods. For example, after defining the light interface, any number of different types of lights, each with their own respective program, can be created. Table 2 illustrates the source code of two example subshaders for subshaders implementing the light interface.

TABLE 2

Example Subshaders

```
// Declare object type (light shader) for point lights
struct PointLight : Light {
float3 pos, color;
float3 direction(float3 p) {return pos – p; }
float3 illuminate(float3 p, out float3 lv) {
lv = normalize(direction(p));
return color;
}
};
// Declare object type (light shader) for directional lights
struct DirectionalLight : Light {
```

TABLE 2-continued

Example Subshaders

```
    float3 dir, color;
    float3 direction(float3 p) { return dir; }
    float3 illuminate(float3 p, out float3 lv) {
    lv = normalize(dir);
    return color;
    }
};
```

Each light subshader implements its own versions of the direction and illuminate methods of the interface. This enables each light subshader to implement different behaviors for a given interface. Because each light program uses the same interface, which has the same method prototypes, a subshader, for example a surface shader program, can call any type of light program without modification. Although the above examples show the use of interfaces to define separate light shaders, this functionality can be used to create interoperable modules for any purpose.

Following the creation of one or more subshaders, the developer can define one or more shader programs integrating the modular subshaders in numerous combinations. In an embodiment, the shader program creates one or more instances of the subshaders. Each instance of a subshader can have its own attribute values. In an alternate embodiment, instances of subshaders can be created at the time of execution by the rendering application.

Table 3 illustrates an example shader program that computes the lighting on a surface from each light instance in an array of lights. The shader program loops through the "lights" array of light instances and applies the illumination to a surface. In this example, the light instances are created at the time of execution by the rendering application.

TABLE 3

Example Shader Program

```
// Main program (surface shader)
float4 main(appin IN, out float4 COUT,
uniform Light lights [ ]) {
...
for (int i=0; i < lights.Length; i++) { // for each light
Cl = lights[i].illuminate(IN.pos, L); // get dir/color
color += Cl * Plastic(texcolor, L, Nn, In, 30); // apply
}
return color;
}
```

As discussed above, the contents of the "lights" array are created by the rendering application. In a further embodiment, the high-level shading language can include unsized arrays, which are arrays in which the size is unknown until the time of execution. Unlike dynamically sized arrays in other programming languages, which use linked lists or other complicated data structures, the unsized arrays are implemented as normal static-sized arrays, with the array size left unspecified until program execution. At the time of execution, the rendering application provides a language runtime, discussed below, with the contents of the "lights" array and the array size. This information is used by the language runtime to compile the shader program into a set of instructions for the graphics processing subsystem. Because the size of the array is known in advance of compilation, there is no need for the overhead normally associated with dynamically-sized arrays. Additionally, graphics processing units often lack the ability to easily allocate additional blocks of memory at runtime, as required by dynamically-sized arrays. Unsized arrays do not require complicated memory allocation schemes and can easily be implemented within a typical graphics processing unit.

In an embodiment, the binding of interfaces to actual methods is resolved by a language runtime module that compiles the subshaders during the execution of a rendering application. As shader programs are compiled, the runtime module determines whether each method call is associated with a method in a user-defined interface. For each interface method call, the runtime module determines from the context the appropriate implementation of the interface to be bound to the method call. In an alternate embodiment, interface binding can be deferred at compile time and instead accomplished through the use of indirect jump instructions to be executed by the graphics processing subsystem.

In an embodiment, the rendering application provides the graphics processing subsystem with shader and subshaders through a language runtime API. The language runtime API enables the rendering application to control and configure the programmability of the graphics processing subsystem. This allows for the creation of instances of subshaders, for the binding together of various combinations of shader programs and subshaders, and for passing parameters and attributes to the programs executed by the graphics processing subsystem.

Table 4 illustrates example C-language source code of a portion of a rendering application that creates, binds, and configures an instance of the light subshader discussed above. It should be noted that the functionality of the language runtime API can be accessed using any programming language.

TABLE 4

Example Rendering Application

```
    light = cgCreateParam("Spotlight");
    cgBindParam(main.light, light);
    cgSetParam(light.color, Red);
```

Figure 3:
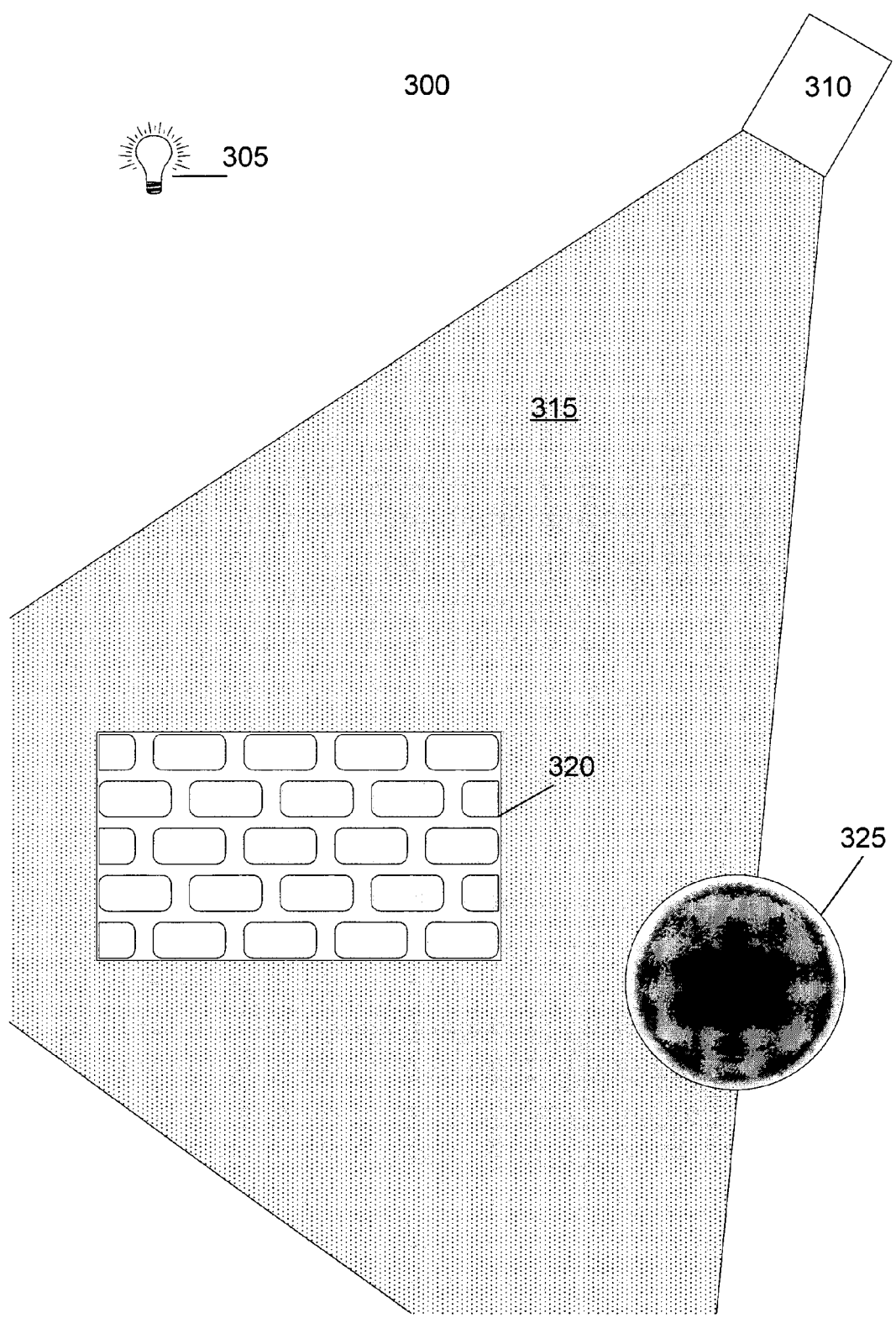
FIG. 3 is an example scene illustrating one application of an embodiment of the invention.

FIG. 3 is an example scene 300 illustrating one application of an embodiment of the invention. In scene 300, there are two light sources, a point light source 305 and a spotlight 310, which cast a beam of light 315. Both the point light source 305 and spotlight 310 can be instances of different light subshaders implementing a common light interface. The light sources 305 and 310 can be hard coded by the application developer in advance or created and configured at the time of program execution.

Scene 300 also includes a brick wall 320 and a metal sphere 325. Like the light sources, the brick wall 320 and metal sphere 325 can be instances of different material subshaders implementing a common material interface. In order to shade each object under the influence of both light sources, the material subshader includes calls to the light sources via the light interface.

Figure 4:
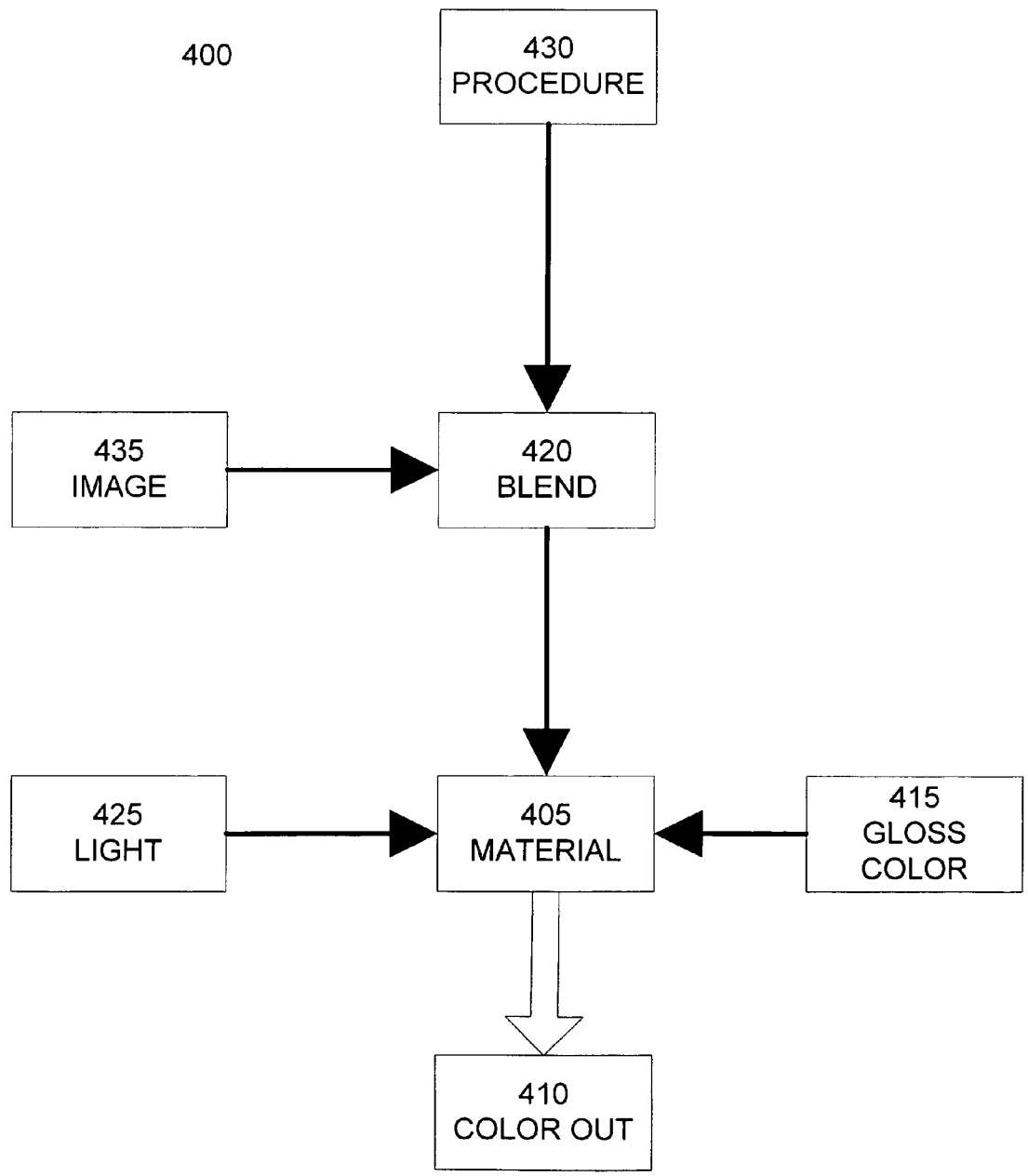
FIG. 4 is an example material tree illustrating another application of an embodiment of the invention.

FIG. 4 is an example material tree 400 illustrating another application of an embodiment of the invention. One approach to defining materials for rendering applications is to decompose the material into trees or networks. The material tree 400 includes a number of nodes. Each node performs one or more simple operations. The outputs of nodes are connected to additional nodes, enabling complex material properties to be defined. Not only does this approach enable content creators, such as 3-D modelers, to define complex materials, but this modular approach enables rendering applications to dynamically define material properties at the time of execution.

A material 405 has the responsibility of computing the color of reflected light at the given point accounting for the material properties and illumination from the light sources. In order to implement material tree 400, a material interface is defined. Typically, a material needs information about the local geometry of the surface, for example the position of the point being shaded, the normal vector at that position, texture coordinates, the incident viewing direction, and information about the lights illuminating the point. Table 5 illustrates the source code of an example material interface.

TABLE 5

Example Material Interface

```
interface Material {
    float3 color(float3 P, float3 N, float3 I, float2 uv,
        Light lights[ ]);
};
```

In this example, the material interface includes one method prototype, "color", for determining the color of a material potentially based on a number of different input arguments. As discussed above, the array "lights" can be an unsized array. Table 6 illustrates an example texture interface. In general, any number of different operations can be bound together to form a material tree. Each node can be linked to other nodes by a material interface, which represent the full procedural description of how a surface reacts to light, or a texture interface, which represents a method that computes a color value at a point that a material uses to account for variation in surface properties over a surface. In other implementations, material trees can be constructed with only one interface or alternatively with any number of different interfaces for connecting various nodes.

TABLE 6

Example Texture Interface

```
interface Texture {
    float3 eval(float3 P, float3 N, float2 uv);
};
```

For material tree 400, material 405 implements the material interface by calling the gloss color subshader 415, the blend subshader 420, and the light instances stored in the light array 425. Similar to the example discussed above, the material 405 can loop through each element of the light array and call the appropriate implementations of the light method defined by a light interface to determine the illumination contribution from each light instance. The material 405 accesses the gloss color 415 via the same material interface used to access material 405. However, material 405 implements the material interface differently than gloss color instance 415. Table 7 illustrates the source code of an example material 405.

TABLE 7

Example Material Implementation

```
struct DiffuseMaterial : Material {
    Texture diffuse;
    float3 color(float3 P, float3 N, float3 I, float2 uv,
        Light lights[ ]) {
        float3 Kd = diffuse.eval(P, N, uv);
        float3 C = float3(0,0,0);
        for (float i = 0; i < lights.length( ); ++i) {
            float3 L;
```

TABLE 7-continued

Example Material Implementation

```
        float3 Cl = lights[i].illuminate(P, L);
        C += Kd * max(0, dot(N, L));
    }
    return C;
    }
};
```

By designing the material in this manner, we make it easy to use the DiffuseMaterial with any kind of texture that we might develop in the future, without needing to modify its source code. As developers assemble a large collection of different Material implementations, this modularity becomes more important. For example, material 405 accesses the blend subshader 420 via a texture interface. The blend subshader 420 blends a texture map 435 and a procedurally generated texture 430. Because the blend subshader 420 is accessed by the standard texture interface defined by the programmer, the underlying operation of the blend subshader 420 is irrelevant to the material 405.

In this example material tree 400, the blend subshader accesses both texture map 435 and procedurally generated texture 430 via the same texture interface. Again, because the textures 435 and 430 are accessed via the texture interface, it does not matter to blend subshader 420 whether the textures blended are simple image look-ups, such as in image 435, or complex procedurally-generated textures, such as texture 430.

Figure 5:
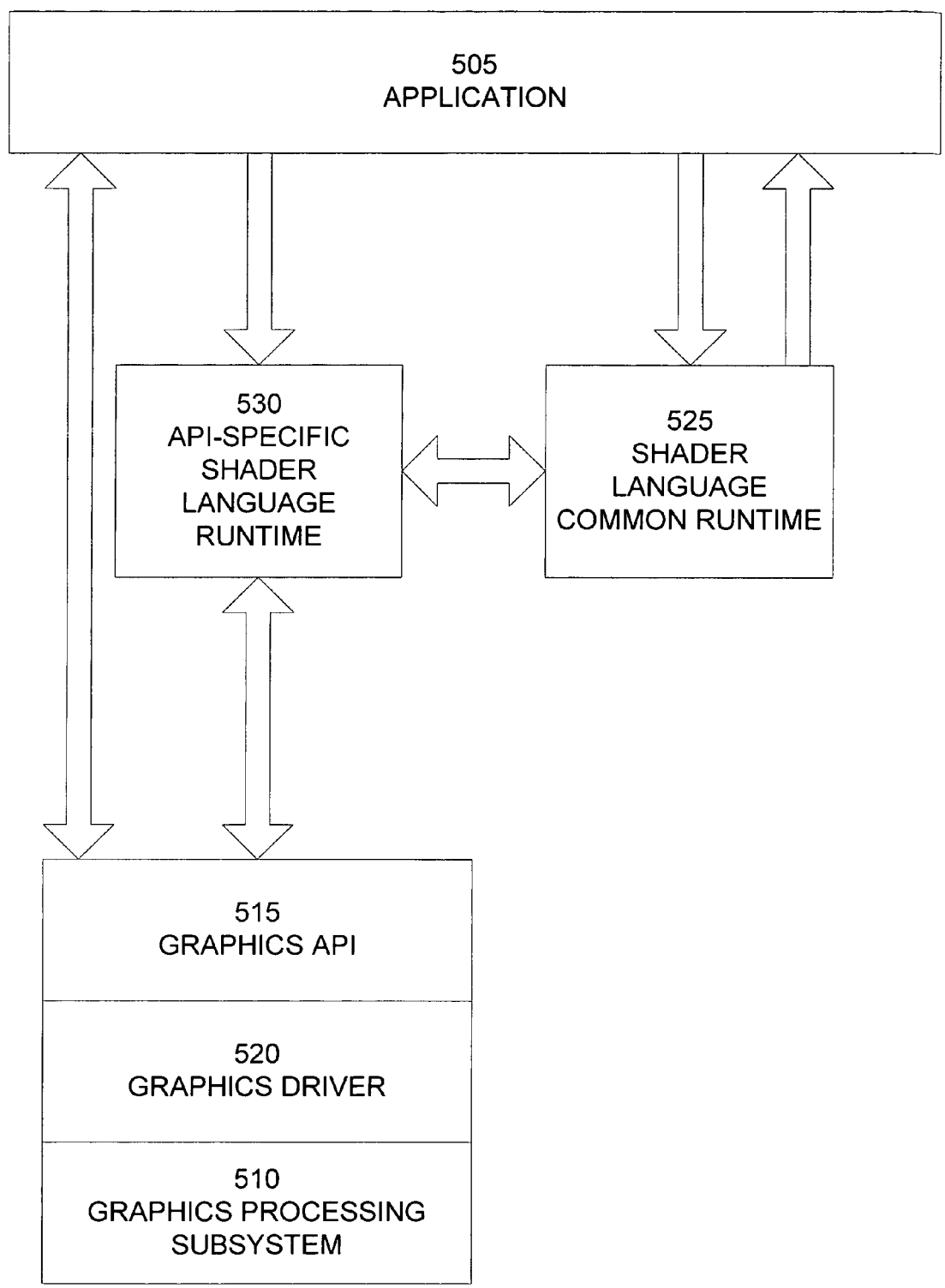
FIG. 5 is a block diagram illustrating the implementation of an embodiment of the invention.

FIG. 5 is a block diagram illustrating the implementation of an embodiment of the invention. A rendering application 505 communicates rendering commands and data to the graphics processing subsystem 510 via a graphics API 515 and graphics driver 520. In this embodiment of the invention, the programmable functionality of the graphics processing subsystem is accessed via language runtime modules 520 and 530. Rendering application 505 uses the language runtime API to compile and manage shader programs to be executed by the graphics processing subsystem.

Application 505 communicates all or a portion of a shader program in the form of source code to common language runtime module 525. Common language runtime module 525 compiles the source code into assembly code adapted to execute on the graphics processing subsystem 510. For subshaders, the common-language runtime module 525 resolves the binding of interfaces to methods. For each interface method call, the common language runtime module 525 determines the appropriate corresponding implementation of the interface method. The common language runtime module 525 then binds the method call to the appropriate method.

In an embodiment, interface method calls are bound to implementing methods using string substitution. In this embodiment, the application 505 instructs the runtime module 525 via runtime API calls to create a particular implementation of an interface and bind the interface implementation to the interface variable in a particular shader program. For example, application 505 might instruct the runtime module to create an implementation for a spotlight and bind it to the shader program for a particular surface. Table 8 illustrates the source code for a shader program prior to binding with an interface implementation.

TABLE 8

Example Shader Program

// Main program (surface shader)
float4 main(Light L) {
...
    return L.illuminate( ... );
}

The common language runtime module 525 recognizes that "Light" is an interface in the shader. As the application 505 has instructed that this interface be bound to a "Spot-Light" implementation, the common language runtime 525 can replace the reference in the source code to the "Light" interface with a reference to the "Spotlight" implementation selected by the application 505. Table 9 illustrates the result of this replacement, with the reference to the "SpotLight" interface being substituted into the source code in place of the reference to the generic "Light" interface.

TABLE 9

Example Shader Program With Interface Binding

// Main program (surface shader)
float4 main(SpotLight L]) {
...
    return L.illuminate( ... );
}

Once the common language runtime module 525 has substituted an interface implementation into the shader program, the shader program can be fully compiled into assembly code for execution by the graphics processing unit. For unsized arrays, the runtime module 525 finalizes the size of the array based on the specific implementation bound to the shader program and compiles the result as a static array.

Although using string substitution to bind interface implementations to shader programs is relatively straightforward to implement, string substitution does not prevent applications from erroneously binding implementations to incompatible interface errors. In a further embodiment, the runtime module 525 parses a shader program into an intermediate internal form prior to receiving a specific binding from the application. In its intermediate form, the shader program will include one or more method calls to interface methods that cannot be resolved because no implementation has been bound to the methods yet. As the application makes additional runtime API calls to create implementations and bind implementations to the shader program, these references are resolved and the shader program can be compiled into its final form.

Regardless of the system used to bind interface implementations to shader programs, as the runtime module must take into account the limitations of the underlying graphics processing unit as it compiles shader programs. For example, some graphics processing units have extremely limited or non-existent branching capabilities. In an embodiment, the runtime module compensates for this limitation by placing the assembly code implementing a method in-line into the main program body. In a further embodiment, loops may be unrolled to optimize the shader program for a particular graphics processing unit.

Alternatively, for graphics processing units that support more advanced execution flows, indirect jump instructions can be used to implement interface bindings and execute calls to interface methods. In this alternate embodiment, interface binding is deferred at compile time and instead accomplished at shader runtime as an interface method is called. In this embodiment, each subshader implementation of an interface has a table or array of pointers to methods. The table has entries corresponding to each of the interface methods, with each table entry storing a pointer to its respective method in memory. Each subshader implementation of the same interface stores its method pointers in the same order in its table.

As the runtime module binds a subshader to a shader program, the appropriate table corresponding to the subshader's implementation is associated with the shader program. When an interface method is called, the table corresponding to the particular interface binding is referenced to locate the appropriate implementation of the desired method. The graphics processing unit then jumps to this location to execute the method. In a further embodiment, the interface binding can be easily changed by modifying the value of the method pointer in the appropriate table, eliminating the need for recompilations to change an interface binding.

When a shader program is to be executed by the graphics processing unit, the assembly language version of the shader program is converted into binary code suitable for execution by the graphics processing unit. In an embodiment, the API-specific language runtime module 530 combines the assembly code version of the shader program with any parameter values supplied by the rendering application 505, and forwards the shader program to the graphics processing subsystem 510 for execution. In a further embodiment, the graphics driver includes an assembler for converting the assembly language version of the shader program into binary code. In a further embodiment, assembly code version of the shader program is optionally returned to the rendering application for integration with additional assembly language shader code manually created by the programmer.

This invention provides a system for shader programs to make calls to abstract interfaces, without knowing what the particular implementation of the interface will be, in a way that reduces the burden on the programmer with no performance compromises. This allows applications to program a graphics processing unit by combining two or more subshaders together. Additionally, these combinations of subshaders can be determined by the application at runtime. This feature greatly increases the flexibility of programming model; however, the runtime modules enable this flexibility without increasing the complexity of the underlying graphics processing unit. Although the invention has been discussed with respect to specific examples and embodiments thereof, these are merely illustrative, and not restrictive, of the invention. Thus, the scope of the invention is to be determined solely by the claims.

What is claimed is:

1. A computer readable storage medium having instructions for performing the method of programming a graphics processing subsystem, the method comprising:

selecting a first shader program for execution by the graphics processing subsystem;

identifying a reference to a method associated with an interface in the first shader program;

selecting one of a plurality of subshaders, wherein each subshader implements the method associated with the interface;

binding the first shader program with the selected subshader to create a combined shader program;

compiling the combined shader program to create a compiled shader program;

communicating the compiled shader program with the graphics processing subsystem;

receiving an array size parameter; and creating an array having a size determined by the array size parameter.

2. The computer readable storage medium of claim 1, wherein binding uses string substitution to merge the first shader program with the selected subshader.

3. The computer readable medium of claim 1, wherein selecting one of a plurality of subshaders comprises receiving a command from a rendering application via a language runtime API.

4. The computer readable storage medium of claim 1, wherein the plurality of subshaders specify a plurality of implementations of lights.

5. The computer readable storage medium of claim 1, wherein the plurality of subshaders specify a plurality of implementations of materials.

6. The computer readable storage medium of claim 5, wherein the combined shader program is a material tree.

7. The computer readable storage medium of claim 1, wherein the plurality of subshaders specify a plurality of implementations of textures.

8. The computer readable storage medium of claim 1, wherein binding uses indirect addressing to merge the first shader program with the selected subshader.

9. The computer readable storage medium of claim 1, wherein selecting a first shader program for execution by the graphics processing subsystem comprises receiving a command from a rendering application via an language runtime API.

10. The computer readable storage medium of claim 1, wherein the first shader program and the one of the plurality of subshaders is selected by a graphics application adapted to be executed on a central processing unit; and wherein the combined shader program is adapted to be executed by the graphics processing subsystem.

11. The computer readable storage medium of claim 10, wherein the graphics application is adapted to select the first shader program and one of the plurality of subshaders at runtime.

12. The computer readable storage medium of claim 1, wherein binding creates a table of method pointers referencing the methods of an interface implementation.

13. The computer readable storage medium of claim 1 wherein compiling comprises creating an assembly language version of the combined shader program adapted to the architecture of the graphics processing subsystem.

14. The computer readable storage medium of claim 13, wherein communicating further comprises:
   forwarding the assembly language version of the combined shader program to an assembler;
   creating a binary version of the combined shader program adapted to be executed by the graphics processing subsystem; and
   communicating the binary version of the combined shader program with the graphics processing subsystem.

15. The computer readable storage medium of claim 14, wherein the assembler is included as part of a graphics driver program adapted to facilitate communications between a graphics application executed by a central processing unit and the graphics processing subsystem.

* * * * *